(12) United States Patent
Bodin et al.

(10) Patent No.: US 8,684,449 B2
(45) Date of Patent: Apr. 1, 2014

(54) B-PILLAR FOR A VEHICLE

(75) Inventors: Hans Bodin, Sodra Sunderbyn (SE); Jan Krispinsson, Lulea (SE); Paul Akerstrom, Lulea (SE); Daniel Berglund, Norrfjarden (SE); Lars Wikstrom, Sodra Sunderbyn (SE); Martin Holmberg, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 107 days.

(21) Appl. No.: 13/261,320

(22) PCT Filed: Dec. 12, 2010

(86) PCT No.: PCT/SE2010/000296
§ 371 (c)(1),
(2), (4) Date: Jun. 11, 2012

(87) PCT Pub. No.: WO2011/071434
PCT Pub. Date: Jun. 16, 2011

(65) Prior Publication Data
US 2012/0319431 A1    Dec. 20, 2012

(30) Foreign Application Priority Data

Dec. 13, 2009 (SE) ........................................ 0901550

(51) Int. Cl.
*B62D 25/04* (2006.01)

(52) U.S. Cl.
USPC .................................. 296/193.06; 296/187.12

(58) Field of Classification Search
CPC .................................................... B62D 29/007
USPC .......... 296/193.06, 187.12, 203.03; 29/897.2; 280/784
See application file for complete search history.

(56) References Cited

U.S. PATENT DOCUMENTS

| | | | |
|---|---|---|---|
| 5,972,134 A | 10/1999 | Buschsieweke et al. | |
| 7,278,287 B2 | 10/2007 | Bohner et al. | |
| 8,136,871 B2 * | 3/2012 | Yoshida et al. | 296/205 |
| 8,292,354 B2 * | 10/2012 | Bodin et al. | 296/193.06 |
| 2008/0315628 A1 * | 12/2008 | Obayashi | 296/193.06 |
| 2010/0064759 A1 * | 3/2010 | Kondo et al. | 72/342.3 |
| 2011/0133515 A1 * | 6/2011 | Mori | 296/193.06 |

FOREIGN PATENT DOCUMENTS

WO    WO-2009/064236 A1 *    5/2009
WO    WO2009/123538          10/2009

* cited by examiner

*Primary Examiner* — Jason S Morrow
(74) *Attorney, Agent, or Firm* — Mark P. Stone

(57) ABSTRACT

The invention relates to a B-pillar for a vehicle including a main section (20) with a hat-shaped section (21) comprising a central flange (22), two web portions (23, 24) and two side flanges (25, 26). At least the hat-shaped section (21) is press-hardened and has a breaking strength in excess of 1400 MPa and the side flanges (25, 26) of the hat-shaped section (21) have a breaking strength below 1100 MPa along at least part of the length of the side flanges (25, 26). The B-pillar (13) includes a cover plate (40) welded to the side flanges (25, 26) of the hat-shaped section (21) so as to form a closed profile, the cover plate (40) having a breaking strength below 1100 MPa at least in the region in which it bears against the side flanges (25, 26). The side flanges (25, 26) of the hat-shaped section have a breaking strength below 1100 MPa in the region in which the side flanges bear against the cover plate (40).

21 Claims, 2 Drawing Sheets

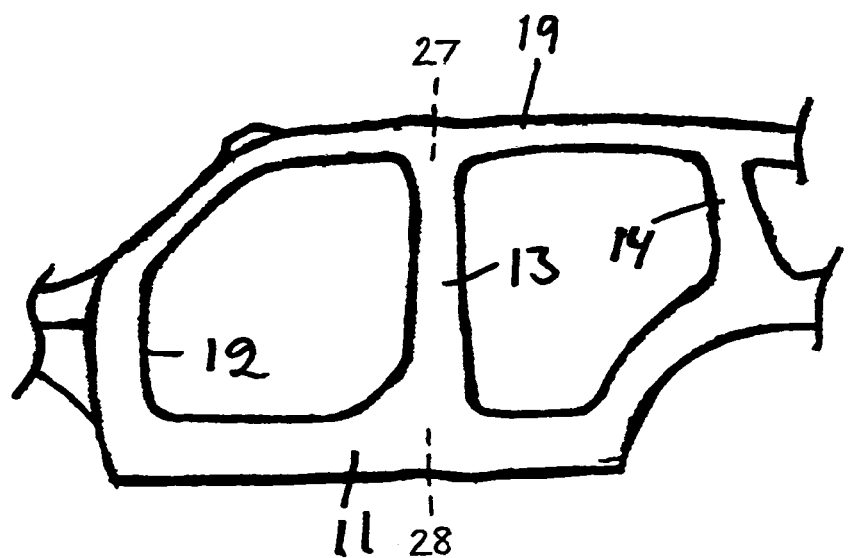
FIG. 1
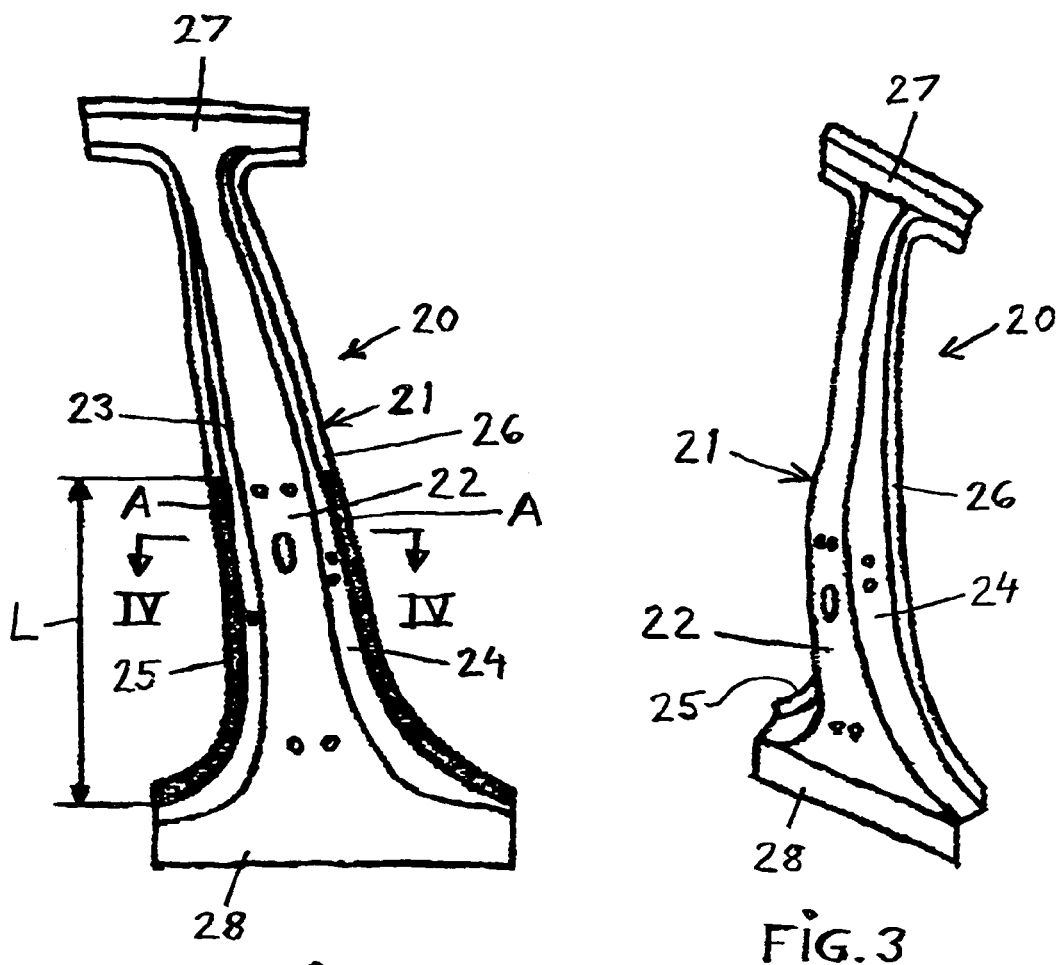
FIG. 2
FIG. 3

B-PILLAR FOR A VEHICLE

TECHNICAL FIELD OF THE INVENTION

The invention relates to a B-pillar according to the pre-characterising part of claim 1.

BACKGROUND OF THE INVENTION

The pillar from which the front door of a vehicle is normally suspended is referred to as an A-pillar. This pillar extends up along the windscreen and is connected to the roof member above the doors. In the event of a lateral collision, the passenger is protected by the door, as well as by the A-pillar in front of the door, the B-pillar behind the door, the sill member below the door and the roof member above the door. B-pillars the edges of which are trimmed after forming and hardening are known from U.S. Pat. No. 7,278,287 B2. The pillars are manufactured with soft edges in order to reduce the wear of the edge-trimming tool.

AIM OF THE INVENTION AND BRIEF DESCRIPTION OF THE INVENTION

One aim of the invention is to improve the protection for passengers in the event of a lateral collision. This is achieved, inter alia, by designing the B-pillar in such a manner that it can be deformed without reduced crack formation in the region of the weld having an adverse effect on the energy absorption capacity of the B-pillar. The aim of the invention is achieved in that the device has the features specified in the claims.

BRIEF DESCRIPTION OF THE DRAWINGS

FIG. 1 is a side view of the central part of the load-bearing part of a passenger car.
FIG. 2 shows the main section of a B-pillar in the exposed state.
FIG. 3 is a perspective view of the main section of the B-pillar.

DETAILED DESCRIPTION OF ILLUSTRATED EMBODIMENT OF THE INVENTION

Figure 4:
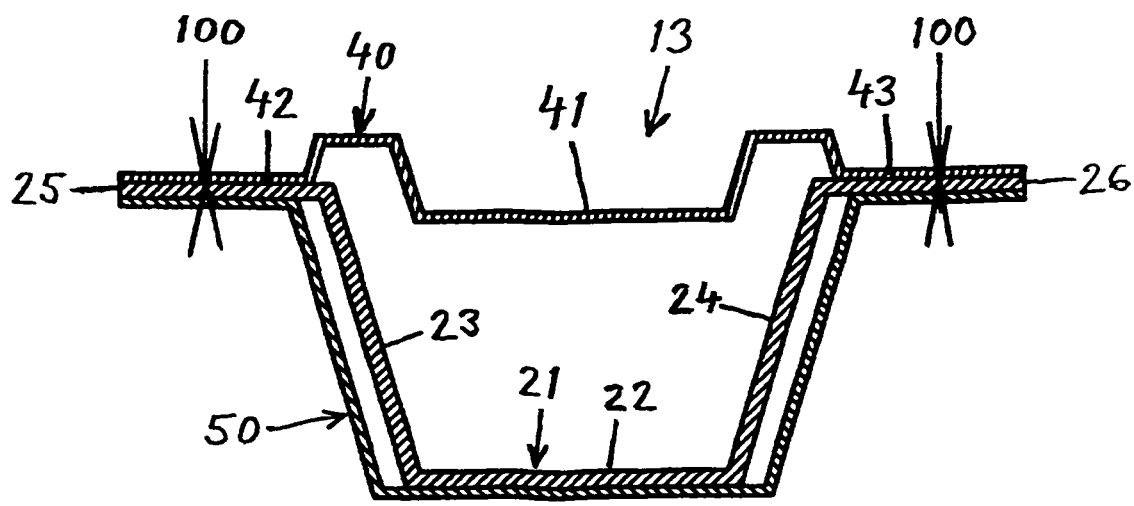
FIG. 4 is a section along the line IV-IV of FIG. 2, but in which a cover plate or outer panel is added to the B-pillar.
Figure 5:
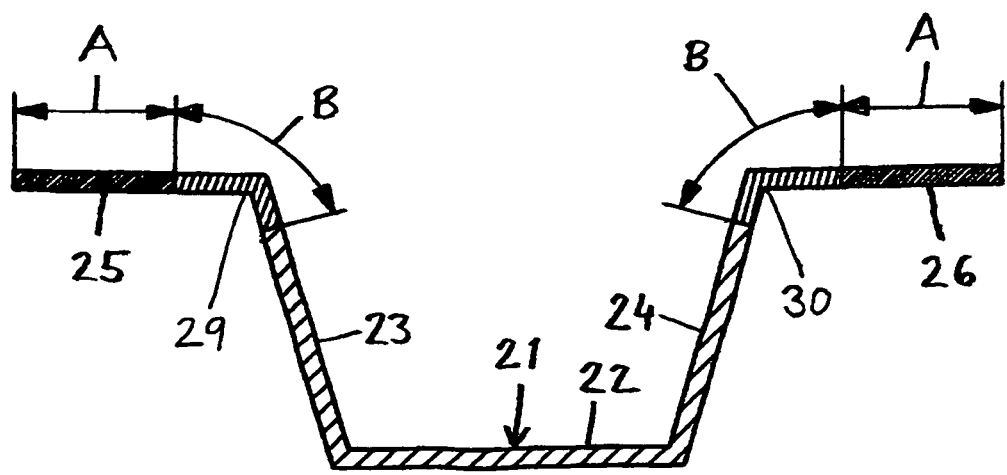
FIG. 5 is a section through the hat-shaped member of the B-pillar.

FIG. 1 is a diagram showing the load-bearing parts of one side of a vehicle with a sill member 11 to which an A-pillar 12, a B-pillar 13 and a C-pillar 14 are welded. The B-pillar 13 is welded at its upper end to a roof member 19.

FIGS. 2-5 show a main section 20 of a B-pillar, the main part 20 of which includes a hat-shaped section/hat-shaped member 21 with a central flange 22, two web portions 23, 24 and two side flanges 25, 26. The main section 20 is provided at its upper and lower ends with portions 27, 28 for connection to the roof member 19 and the sill member 11 of a vehicle chassis. The central flange 22 is directed towards the outside of the vehicle.

FIG. 3 shows that the hat-shaped member 21 normally has varying width and height dimensions along its length. The main section 20 normally also has a certain longitudinal curvature dependent, inter alia, on the vehicle design.

FIG. 4 is a cross section showing a finished B-pillar 13 according to the invention, in which an inner cover plate 40 is arranged in such a manner that it forms a box section or closed profile together with the hat-shaped section 21. In the embodiment shown, the cover plate 40 is designed in such a manner that its central portion 41 is situated within (below) the zones 42, 43 in which the cover plate 40 bears against the side flanges 25, 26 of the hat-shaped section 21. It will be clear that the cover plate 40 may also be flat or may optionally be profiled, wherein, e.g. the central portion 41 may also be situated outside (above) the surfaces of the cover plate 40 bearing against the side flanges 25, 26. It will therefore be clear that the cover plate may be of any desired design and dimensions within the scope of the invention. If desired, the cover plate may cover a greater or lesser portion of the hat-shaped section 21 and may also be divided into two or more smaller cover plates.

The finished B-pillar according to the invention normally also includes an outer panel 50, e.g. of steel, designed in such a manner that it fits over the main section 20 and covers the latter in the desired longitudinal section. The outer panel 50 may sometimes be omitted and, when it is used, it is most often for aesthetic reasons and/or for sealing purposes.

The main section 20 is manufactured by press hardening, i.e. it is hot-formed and hardened from a flat blank of boron steel in one step in cooled forming tools. It is hardened to a breaking strength in excess of 1400 MPa, but certain parts of its side flanges 25, 26 are not fully hardened and have a breaking strength below 1100 MPa. Portions of this kind which have not been fully hardened can be referred to as soft zones A and their breaking strength may advantageously be between 500 and 1000 MPa. This reduced strength can be achieved in various ways, e.g. by heating the surfaces of the tool pair bearing against the product, while cooling the remaining parts of the tool pair. The flat parts 25, 26 of the side flanges have the desired lower breaking strength, while the adjacent curved portions 29, 30 form a transition zone B to fully hardened material.

The length L of the soft zone of the side flanges 25, 26 may preferably be approximately 50% of the total length of the side flanges and a soft zone A of this kind is shown by a shaded portion along the side flanges 25, 26 in FIG. 2. However, it will be clear that the length and the position of the soft zones A can be varied as required depending, inter alia, on the desired deformation properties and/or the design of the cover plate. The length L is advantageously approximately 10-80% of the total length of the side flanges 25, 26.

The cover plate 40 can be manufactured by press hardening with the same high breaking strength (at least 1400 MPa) and with the same lower breaking strength (no more than 1100 MPa) mentioned hereinabove in the flanges or in the portion 42, 43 bearing against the side flanges 25, 26 of the hat-shaped section 21. However, the cover plate 40 may also be cold-formed in a steel having a breaking strength below 1100 MPa, e.g. with a strength of 300-1000 MPa. The side flanges 25, 26 of the hat-shaped section 21 and the zones of the cover plate bearing against the side flanges 25, 26 advantageously both have approximately the same strength and ductility. The dimensions of the cover plate 40 or, as applicable, the cover plates are adapted to the desired performance of the B-pillar.

The breaking strength of the outer panel 50 is normally below 1100 MPa.

As will be clear from FIG. 4, the softened side flanges 25, 26 of the main section 20 are spot-welded to the cover plate 40 and any outer panel/outer plate 50 by means of the required number of spot welds so as to obtain a finished B-pillar. The spot welds are designated 100 and are present in the required number. Laser welding is also suitable. The outer panel 50 may be omitted in certain cases. The soft zone A of the side flanges 25, 26 is arranged in such a manner that the cover plate 40 is welded to the side flanges 25, 26 within the soft zone or soft zones A. The B-pillar thus has a closed profile along at least part of its length.

In the event of a lateral collision, e.g. with another vehicle hitting the B-pillar, the lower strength and greater ductility of the flanges 25, 26 reduces the risk of fracture of the B-pillar before it has absorbed the maximum amount of energy by plastic deformation, thereby improving the protection of affected passengers.

It will be clear that there are many possible geometric variations for the complete B-pillar and its constituent components within the scope of the invention.

The invention is thus not limited to what is illustrated and described here and amendments and modifications are possible within the scope of the following claims.

The invention claimed is:

1. B-pillar for a vehicle including a main section (20) with a hat-shaped section (21) comprising a central flange (22), two web portions (23, 24) extending from opposed ends of said central flange, and two side flanges (25, 26) extending, respectively, a predetermined length from respective opposed ends of said two web portions, wherein said B-pillar has at least one section oriented subtantially transversely to the longitudinal direction of extension of said B-pillar in which the central flange and at least portions of said web portions of said hat-shaped section (21) are press-hardened and have a breaking strength in excess of 1400 MPa, and in which the side flanges (25, 26) of the hat-shaped section (21) have a breaking strength below 1100 MPa along at least part of the length of the side flanges (25, 26).

2. B-pillar according to claim 1, wherein the breaking strength is below 1100 MPa over the entire width of said at least part of the length of the side flanges (25, 26).

3. B-pillar according to claim 1, wherein said B-pillar includes a cover plate (40) welded to the side flanges (25, 26) of the hat-shaped section (21) so as to form a closed profile, and that the cover plate (40) has a breaking strength below 1100 MPa at least in a region in which the cover plate bears against the side flanges (25, 26).

4. B-pillar according to claim 3, wherein the side flanges (25, 26) of the hat-shaped section have a breaking strength below 1100 MPa in a region in which the side flanges bear against the cover plate (40).

5. B-pillar according to claim 3, wherein the cover plate (40) is flat.

6. B-pillar according to claim 3, wherein the cover plate (40) is profiled.

7. B-pillar according to claim 1, wherein the part of the length of the side flanges (25, 26) having a breaking strength below 1100 MPa is between 10-80% of the total length of the side flanges.

8. B-pillar according to claim 3, wherein the cover plate (40) is arranged in a portion of the hat-shaped section (21) directed towards a sill member (11) of the vehicle.

9. B-pillar according to claim 1, wherein the B-pillar includes an outer panel or outer plate (50) substantially matching the shape of the hat-shaped section (21).

10. B-pillar according to claim 2, wherein the B-pillar includes a cover plate (40) welded to the side flanges (25, 26) of the hat-shaped section (21) so as to form a closed profile, and that the cover plate (40) has a breaking strength below 1100 MPa at least in a region in which the cover plate bears against the side flanges (25, 26).

11. B-pillar according to claim 4, wherein the cover plate (40) is flat.

12. B-pillar according to claim 4, wherein the cover plate (40) is profiled.

13. B-pillar according to claim 10, wherein the side flanges (25, 26) of the hat-shaped section have a breaking strength below 1100 MPa in a region in which the side flanges bear against the cover plate (40).

14. B-pillar according to claim 10, wherein the cover plate (40) is flat.

15. B-pillar according to claim 10, wherein the cover plate (40) is profiled.

16. B-pillar according to claim 2, wherein the part of the length of the side flanges (25, 26) having a breaking strength below 1100 MPa is between 10-80% of the total length of the side flanges.

17. B-pillar according to claim 3, wherein the part of the length of the side flanges (25, 26) having a breaking strength below 1100 MPa is between 10-80% of the total length of the side flanges.

18. B-pillar according to claim 4, wherein the cover plate (40) is arranged in a portion of the hat-shaped section (21) directed towards a sill member (11) of the vehicle.

19. B-pillar according to claim 2, wherein the B-pillar includes an outer panel or outer plate (50) substantially matching the shape of the hat-shaped section (21).

20. B-pillar according to claim 3, wherein the B-pillar includes an outer panel or outer plate (50) substantially matching the shape of the hat-shaped section (21).

21. B-pillar according to claim 1, wherein at least one transition region (B) between adjacent ends of one said web portion and one said side flange, respectively, has a breaking strength transitioning between 500 MPa and 1400 MPa.

* * * * *